US012780730B2

(12) United States Patent
Zhu et al.

(10) Patent No.: US 12,780,730 B2
(45) Date of Patent: Nov. 3, 2026

(54) INORGANIC PELLETIZED PERLITIC LIGHTWEIGHT GRANULES AND THEIR PREPARATION METHOD AND APPLICATION

(71) Applicant: Hip Hing Construction Technology Limited, Hong Kong (CN)

(72) Inventors: Honggang Zhu, Hong Kong (CN); Shichang Ye, Hong Kong (CN); Xiaohu Zhu, Hong Kong (CN); Kwok-Leung So, Hong Kong (CN); Pui-Lam Ng, Hong Kong (CN)

(73) Assignee: Hip Hing Construction Technology Limited, Hong Kong (CN)

( * ) Notice: Subject to any disclaimer, the term of this patent is extended or adjusted under 35 U.S.C. 154(b) by 759 days.

(21) Appl. No.: 17/864,987

(22) Filed: Jul. 14, 2022

(65) Prior Publication Data

US 2023/0042195 A1 Feb. 9, 2023

(30) Foreign Application Priority Data

Jul. 16, 2021 (CN) ......................... 202110808595.3

(51) Int. Cl.
*C04B 14/18* (2006.01)
*C04B 20/00* (2006.01)
*C04B 20/10* (2006.01)
*C04B 111/40* (2006.01)

(52) U.S. Cl.
CPC ........ *C04B 14/185* (2013.01); *C04B 20/0016* (2013.01); *C04B 20/1077* (2013.01); *C04B 2111/40* (2013.01)

(58) Field of Classification Search
None
See application file for complete search history.

(56) References Cited

PUBLICATIONS

English translation of Wang et al. (CN 111548042) (Year: 2020).*
English translation of Pang et al. (CN 103496866). (Year: 2014).*
English translation of Hashimura et al. (JP 2008-050185). (Year: 2008).*

* cited by examiner

*Primary Examiner* — Ronak C Patel

(57) ABSTRACT

The present invention discloses inorganic pelletized perlitic lightweight granules and a preparation process and use thereof. The present invention develops through encapsulation technology a novel type of lightweight particles, namely, inorganic pelletized perlitic lightweight granules comprising expanded perlite as a core material and a cementitious material as a shell material, forming a core-shell structure in which a perlite core is encapsulated in a cementitious shell. The cementitious material including cement and fly ash is coated onto the surface of expanded perlite particles through an encapsulation process by a pelletizer under controlled water spraying. The resulting inorganic pelletized perlitic lightweight granules are lower in cost and easier to produce, and have better fire resistance, higher crushing strength, and better compatibility with concrete. The inorganic pelletized perlitic lightweight granules can overcome the problems of conventional lightweight concrete, such as high water absorption and inconsistent performance.

6 Claims, 4 Drawing Sheets

INORGANIC PELLETIZED PERLITIC LIGHTWEIGHT GRANULES AND THEIR PREPARATION METHOD AND APPLICATION

FIELD

The present invention is related to the technical field of concrete materials, and more specifically, to inorganic pelletized perlitic lightweight granules and a preparation process and use thereof.

BACKGROUND

Lightweight concrete is generally achieved by introducing closed pores or adding lightweight particles into cementitious slurry or mortar. At present, foamed concrete, which is a lightweight material containing a large number of closed pores, is a prevailing type of lightweight concrete. Foamed concrete is generally formed by homogeneously mixing the pre-formed foam with cementitious slurry or mortar, while the pre-formed foam is created by diluting a liquid foaming agent with water in predetermined proportions and passing this mixture through a foam generator. The foamed concrete is a porous thermal insulating material, and the closed pores formed within foamed concrete make the concrete lightweight and thermal insulating. Besides foamed concrete, forming lightweight concrete by introducing lightweight particles is becoming increasingly popular. Development of suitable lightweight particles is necessary to form lightweight concrete by using lightweight particles.

However, one of the common weakness of existing lightweight concrete is their relatively poor mechanical properties such as strength. Specifically, the compressive strength of foamed concrete is usually at the low side due to the pores inside; Moreover, the lightweight concrete formed by adding lightweight particles, regardless of natural or synthetic particles, also shows unsatisfactory mechanical properties.

Regarding synthetic lightweight particles, one existing technique is expanded polystyrene (EPS) particles with pores foamed inside make the particles lightweight. However, the preparation process of EPS particles are complicated, including kneading, pelletizing, coating, drying, etc. Moreover, EPS has low strength (<0.5 MPa) and it has relatively low softening point (~90° C.) and melting point (~240° C.), rendering EPS unfavourable for use as a constituent of lightweight concrete in building construction. Another existing technique is to make lightweight particles by coating porous materials with inorganic material; However, such particles are generally formed by sintering, which requires high energy consumption, and the sintering process may alter the structure of the porous material, making the particles not as lightweight and strong as expected. The other existing technique is to form lightweight particles by introducing air pores into particles; However, such particles have large water absorption ratio and would absorb large amount of water during handling, leading to high water absorption ratio of the resultant concrete.

To avoid detrimental effects on the mechanical and physical properties of lightweight concrete, lightweight particles with higher performance are required. Therefore, there is still needs to improve the lightweight particles and preparation processes thereof.

SUMMARY

The present invention aims to solve one of the key problems in the lightweight particles technique for concrete production, at least to a certain extent. In this regard, the objective of the present invention is to provide a type of inorganic pelletized perlitic lightweight granules and preparation process and use thereof. Compared with existing lightweight particles, the inorganic pelletized perlitic lightweight granules are lower in cost and easier to produce, and have better fire resistance, higher crushing strength and better compatibility with concrete. The inorganic pelletized perlitic lightweight granules are suitable for the production of lightweight concrete, especially high-strength lightweight concrete, and can overcome the problems of conventional lightweight concrete, such as high water absorption and large variation in performance.

In a first aspect of the present invention, a kind of inorganic pelletized perlitic lightweight granules are proposed. In order to obtain high-performance lightweight particles for the production of lightweight concrete, the present invention develops a novel type of lightweight particles, namely, inorganic pelletized perlitic lightweight granules (as shown in FIG. 1 and FIG. 4), using encapsulation technology. The inorganic pelletized perlitic lightweight granules include expanded perlite as core material and cementitious material as shell material, and have a core-shell structure in which perlite core is encapsulated in cementitious shell.

The perlite core has a porous structure in order to achieve lightweight, and the cementitious shell has a dense structure in order to provide strength.

According to an embodiment of the present invention, the cementitious material and the expanded perlite have a volume ratio of 1:(0.3 to 3.0).

According to an embodiment of the present invention, the lightweight expanded perlite inorganic particles have a particle size of 0.5 to 20 mm.

According to an embodiment of the present invention, the lightweight expanded perlite inorganic particles have a dry density of 580 to 1200 kg/m$^3$.

According to an embodiment of the present invention, the cementitious material is cement.

According to an embodiment of the present invention, the cementitious material is a mixture of cement and fly ash.

According to an embodiment of the present invention, the mass ratio of cement and fly ash of cementitious material is 1:(0 to 1).

According to an embodiment of the present invention, the core-shell structure is formed via an encapsulation process with a pelletizer.

In a second aspect of the present invention, a preparation process of the inorganic pelletized perlitic lightweight granules is provided. The preparation process involves encapsulating expanded perlite particles with cementitious materials, i.e. cement or a mixture of cement and fly ash, in a pelletizer under controlled water spraying via an encapsulation process.

The preparation process of the inorganic pelletized perlitic lightweight granules involves gradually encapsulating the expanded perlite with the cementitious material via an encapsulation process in which the cementitious materials and expanded perlite are mixed in a pelletizer under water spraying, and finally forming the inorganic pelletized perlitic lightweight granules of the present invention.

According to an embodiment of the present invention, the preparation process of the inorganic pelletized perlitic lightweight granules includes the following steps:

1. Mixing: mixing specified amounts of expanded perlite and cementitious material to obtain the mixture of expanded perlite and cementitious material;

S2. Pelletization: spraying water to the mixture (in a pan pelletizer) obtained in Step S1 with continuous rotating of pan pelletizer to allow the cementitious material gradually encapsulating the expanded perlite, thereby obtaining particles composed of expanded perlite fully covered with cementitious material (as shown in FIG. 2); and S3. Curing: curing the aforementioned particles obtained in Step S2 in a sealed environment for at least 1 day.

According to an embodiment of the present invention, the mass of water sprayed is equal to 20 to 35 wt % of the mass of cementitious material, and the duration of water spraying is 10 to 60 minutes. That is, during the pelletization, water is automatically sprayed to the mixture of expanded perlite and cementitious material within 10 to 60 minutes.

According to an embodiment of the present invention, the pelletization process is carried out in a pan pelletizer, where the pelletizer pan has an inclination angle of 20 to 60 degrees and a rotating speed of 10 to 60 r/min.

According to an embodiment of the present invention, after the surface of expanded perlite is fully covered with cementitious material, the pan pelletizer continues to rotate for at least 5 minutes to allow the cementitious shell becomes dense enough.

According to an embodiment of the present invention, Steps S1~S3 are repeated for 1-4 times, and the surface of expanded perlite is encapsulated with cementitious material in 2 to 5 pelletization processes. When the mass ratio of the cementitious material to the expanded perlite is too large, the cementitious materials is difficult to be fully attached to the surface of expanded perlite in one pelletization process. Attaching the cementitious materials to surface of expanded perlite in more than one palletization process would allow the cementitious materials uniformly and strongly bonded on the surface of expanded perlite. For the initial Step S1, the expanded perlite and a portion of the cementitious material are mixed; For the thereafter repeated Step S1, the cured particles (consisting of expanded perlite encapsulated with cementitious materials) obtained in previous preparation process and another portion of the cementitious material are mixed. That is, multiple encapsulation is carried out. Specifically, Steps S1~S3 are repeated as S1'~S3', and so on in a similar format.

S1'. Mixing: mixing specified amounts of particles obtained in Step S3 and cementitious material obtain a mixture of the particles and the cementitious material;

S2'. Pelletization: spraying water to the mixture (in a pan pelletizer) obtained in Step S1' with continuous rotating of pan pelletizer to allow the cementitious material to gradually encapsulating the particles, thereby obtaining secondary encapsulated particles composed of particles fully covered with cementitious material; and S3'. Curing: curing the aforementioned secondary encapsulated particles obtained in Step S2' in a sealed environment for at least 1 day.

According to some embodiments of the present invention, the mass of water sprayed in the initial Step S2 is equal to 20 to 35 wt % of the mass of cementitious material, and the mass of water sprayed in the thereafter repeated Step S2 (that is, Step S2') is 19 to 29 wt % of the mass of cementitious material.

According to some embodiments of the present invention, the preparation process of the inorganic pelletized perlitic lightweight granules includes the following steps:

S1. Mixing: mixing specified amounts of expanded perlite and cementitious material and then moving the resultant mixture to a pan pelletizer, or alternatively mixing specified amounts of expanded perlite and cementitious material in the pan pelletizer, to obtain a mixture of the expanded perlite and the cementitious material;

S2. Pelletization: starting the pan pelletizer with the inclination angle of the pelletizer pan being 20 to 60 degrees, and allowing the pelletizer pan rotate at a speed of 10 to 60 r/min, and then spraying water (mass of water is equal to 20-35 wt % of the mass of cementitious materials) within 10 to 60 minutes to the mixture of expanded perlite and cementitious material obtained in Step S1 to allow the cementitious material gradually attaching to the surface of expanded perlite; After the cementitious material fully attaching to the surface of expanded perlite, keep running the pelletizer for at least 5 minutes to obtain particles composed of expanded perlite encapsulated with cementitious material; and S3. Curing: curing the particles obtained in Step S2 in a sealed environment for at least 1 day.

The above S1 mixing, S2 pelletization, and S3 curing steps are repeated for 1-4 times, and the surface of expanded perlite is encapsulated with cementitious material in 2 to 5 pelletization processes. In the initial Step S1, the expanded perlite and a portion of the cementitious material are mixed; In the thereafter repeated Step S1, the cured particles (consisting of expanded perlite encapsulated with cementitious materials) obtained in previous preparation process and another portion of the cementitious material are mixed. That is, multiple encapsulation is carried out. Specifically, Steps S1~S3 are repeated as S1'~S3', and so on in a similar format.

S1'. Mixing: mixing specified amounts of the particles obtained in Step S3 and the cementitious material and then move them to a pan pelletizer, or alternatively mixing the specified amounts of particles obtained in Step S3 and the cementitious material in the pan pelletizer, to obtain a mixture of the particles and the cementitious material;

S2'. Pelletization: starting the pan pelletizer with the inclination angle of the pelletizer pan being 20 to 60 degrees, and allowing the pelletizer pan rotate at a speed of 10 to 60 r/min, and then spraying water (mass of water is equal to 19-29 wt % of the mass of cementitious materials) within 10 to 60 minutes to the mixture of the particles and the cementitious material obtained in Step S1' to allow the cementitious material gradually attaching to the surface of particles; After the cementitious material fully attaching to the surface of particles, keep running the pelletizer for at least 5 minutes to obtain secondary encapsulated particles composed of particles encapsulated with cementitious material; and S3'. Curing: curing the particles obtained in Step S2' in a sealed environment for at least 1 day.

The expanded perlite in the present invention are from perlite particles produced by crushing, and thus they have an irregular shape and a coarse surface. When inorganic pelletized perlitic lightweight granules are produced by pelletization, cementitious materials strongly adhere to the surface of expanded perlite and a strong interfacial transition zone is formed between the expanded perlite and the cementitious material. Moreover, as a limited amount of water is used during the pelletization process, the cementitious materials gradually adhere to the surface of the expanded perlite, resulting in a rough surface of inorganic pelletized perlitic lightweight granules. When the lightweight inorganic particles are incorporated into concrete, the cementitious shell of lightweight particles would react with the surrounding cementitious binder paste of concrete, promoting formation of a high-strength interfacial transition zone between the inorganic pelletized perlitic lightweight granules and the concrete matrix, which facilitates the interfacial interaction between the inorganic pelletized perlitic lightweight granules and the concrete matrix.

The expanded perlite in the present invention is highly porous, and part of the water mist sprayed during pelletization would be adsorbed into the pores. After the inorganic pelletized perlitic lightweight granules are incorporated into the concrete, water in the expanded perlite gradually evaporates and penetrates into the cementitious shell, or further penetrates into the cementitious binder of concrete, providing a long-term curing effect for the cementitious shell and the cementitious binder of concrete. This effect can enhance the strength of both inorganic pelletized perlitic lightweight granules and the resulting concrete and also reduce drying shrinkage of concrete.

The expanded perlite, which is extremely porous and therefore thermal insulating, accounts for a large portion of the total volume of the inorganic pelletized perlitic lightweight granules. The lightweight concrete made with the inorganic pelletized perlitic lightweight granules would also then contains lots of pores and exhibits superior thermal insulation performance compared with the normal weight concrete.

The inorganic pelletized perlitic lightweight granules of the present invention have the lightweight characteristic as a result of their porous structure. Conventional lightweight porous particles always absorb large amount of water, either during the wetting process or the concrete mixing process, leading to negative effects on the performance (like durability and strength) of concrete. Moreover, the inconsistent porosity of conventional lightweight porous particles makes it difficult to control the performance of resultant lightweight concrete. The inorganic pelletized perlitic lightweight granules of present invention overcomes the aforementioned problems of conventional lightweight porous particles. As a result of the dense cementitious shell, the inorganic pelletized perlitic lightweight granules would not absorb excessive water during handling, even they are immersed in water for pre-wetting prior to concrete mixing, and would not cause large variation in the performance of resultant lightweight concrete. Compared with conventional lightweight particles made from natural materials or industrial by-products or recycled materials, the inorganic pelletized perlitic lightweight granules with dense cementitious shell have much lower and stable water absorption rate below 3% as well as more stable shape, crushing strength and grading.

In the present invention, the encapsulation process of lightweight particles is carried out with a pelletizer, making the inorganic pelletized perlitic lightweight granules have a spherical shape. The spherical shape reduces the friction among the inorganic pelletized perlitic lightweight granules, resulting in significantly enhanced workability of concrete. More importantly, the spherical shape of the inorganic pelletized perlitic lightweight granules could incur arching action under loading and make the force transferring along the spherical shell rather than directly through expanded perlite, which can effectively protect the weak expanded perlite core from being damaged. Test results showed that the compressive strength of the lightweight concrete made from the inorganic pelletized perlitic lightweight granules of the present invention is much higher than that of the lightweight concrete made from untreated expanded perlite.

Encapsulation process makes the expanded perlite with a dry density of about 30-150 kg/m$^3$ covered with a layer of cementitious material which is strong after hardening. This process and the resultant core-shell structure make the inorganic pelletized perlitic lightweight granules have a high strength to density ratio. Test results show that the crushing strength of the inorganic pelletized perlitic lightweight granules can reach over 4.2 MPa at a dry density of about 850 kg/m$^3$.

Both the expanded perlite core and the cementitious shell of the inorganic pelletized perlitic lightweight granules of the present invention are composed of incombustible inorganic materials, and thus the produced inorganic pelletized perlitic lightweight granules possess excellent fire resistance. Moreover, both the core and shell would not release toxic and hazardous chemicals in a fire disaster.

In the present invention, the performance of the inorganic pelletized perlitic lightweight granules, such as density and crushing strength, can be tailored by increasing or reducing the thickness of the shell. The inorganic pelletized perlitic lightweight granules with a thick shell can be used to produce high-strength, lightweight concrete. Test results show that the 28-day compressive strength of the lightweight concrete made with the inorganic pelletized perlitic lightweight granules of the present invention can achieve 51 MPa at an oven dry density of 1680 kg/m$^3$. The inorganic pelletized perlitic lightweight granules with a thin shell can be used to produce normal-strength, lightweight concrete.

The production process of inorganic pelletized perlitic lightweight granules of the present invention mainly involves weighing, mixing, pelletizing, and curing, while no sintering process is needed. And, the aforementioned curing process requires only a sealed container, facilitating the production of inorganic pelletized perlitic lightweight granules. In order to eliminate water evaporation and facilitate the hydration of cementitious shell and hence the strength increase of lightweight particles, a sealed container is always required to store the inorganic pelletized perlitic lightweight granules.

In a third aspect of the present invention, an application of the inorganic pelletized perlitic lightweight granules in production of lightweight concrete is provided. The lightweight concrete contain the inorganic pelletized perlitic lightweight granules prepared following the preparation process of the present invention. The inorganic pelletized perlitic lightweight granules of the present invention are appropriate for production of lightweight concrete, especially for production of high-strength, lightweight concrete, and can overcome the high water absorption and inconsistent performance problems of conventional lightweight concrete.

As compared with the prior art, the present invention has the following beneficial effects and technical advantages.

(1) The inorganic pelletized perlitic lightweight granules of the present invention exhibit a lower cost, ease of production, superior fire resistance, higher crushing strength, and better compatibility with concrete.

(2) Regarding the inorganic pelletized perlitic lightweight granules of the present invention, their expanded perlite core and the cementitious shell are both composed of incombustible inorganic materials, and thus the produced inorganic pelletized perlitic lightweight granules possess excellent fire resistance. Moreover, both the core and shell of the inorganic pelletized perlitic lightweight granules would not release toxic and hazardous chemicals in a fire disaster.

(3) The 28-day compressive strength of the high-strength, lightweight concrete made with the inorganic pelletized perlitic lightweight granules of the present invention can achieve 51 MPa, which is much higher than the strength of lightweight concrete made with untreated expanded perlite.

(4) The inorganic pelletized perlitic lightweight granules of the present invention enhance the strength of lightweight concrete, reduce the drying shrinkage of lightweight concrete, and make the lightweight concrete attain better thermal insulation performance than conventional concrete.

(5) During the pelletization process of the inorganic pelletized perlitic lightweight granules of the present invention, the cementitious materials firmly adhere to the surface of the expanded perlite, leading to formation of a strong interfacial transition zone between the expanded perlite and the cementitious material shell, facilitating the interfacial bonding between the inorganic pelletized perlitic lightweight granules and the concrete matrix.

(6) In the present invention, the inorganic pelletized perlitic lightweight granules are prepared by encapsulating the expanded perlite (core) with a dense cementitious material layer (shell), showing lower water absorption rate and consistent density. The inorganic pelletized perlitic lightweight granules hence would not absorb large amount of water even being immersed in water prior to use, and would eliminate the variation in performance of lightweight concrete. Compared with conventional lightweight particles made from natural materials or industrial by-products or recycled materials, the inorganic pelletized perlitic lightweight granules of the present invention, as a result of their dense shell, have a much lower and more stable water absorption rate below 3%, and more stable shape, crushing strength (breaking strength), density, and grading etc. The inorganic pelletized perlitic lightweight granules of the present invention are appropriate for production of high-strength, lightweight concrete, and can overcome the high water absorption and inconsistent performance problems of conventional lightweight concrete.

BRIEF DESCRIPTION OF THE DRAWINGS

FIG. 6*a* shows the core of the inorganic pelletized perlitic lightweight granule, FIG. 6*b* shows the shell of the inorganic pelletized perlitic lightweight granule, and FIG. 6*c* shows a core/shell interface of the inorganic pelletized perlitic lightweight granule.

REFERENCE SIGNS inorganic pelletized perlitic lightweight granule 100, expanded perlite 110, cementitious material 120, water mist 200.

DETAILED DESCRIPTION

Figure 1:
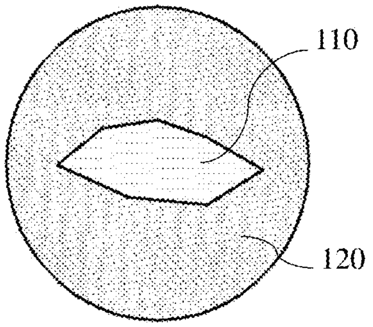
FIG. 1 schematically shows the structure of the inorganic pelletized perlitic lightweight granule of the present invention.
Figure 2:
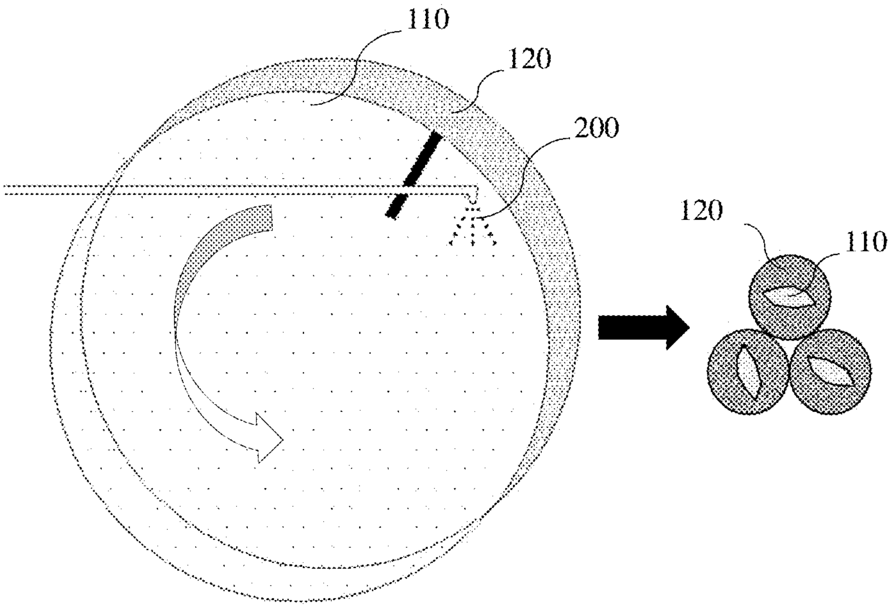
FIG. 2 schematically shows the pelletization process of the inorganic pelletized perlitic lightweight granules of the present invention.
Figure 4:
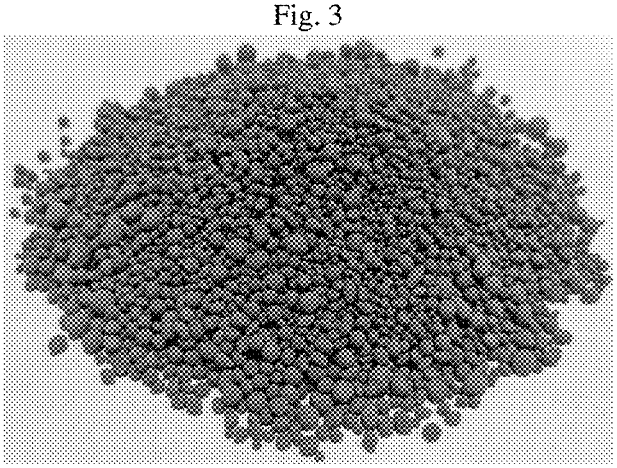
FIG. 4 is a photograph of the inorganic pelletized perlitic lightweight granules of the present invention.

The invention is a further development and extension of water capsule technique on the basis of the technique of patent applications of the present applicant (US 20180222806A1 and CN 201710079925.3). In order to obtain high performance lightweight particles for the production of lightweight concrete, the present invention develops a novel type of lightweight particles, namely, inorganic pelletized perlitic lightweight granules (as shown in FIG. 1 and FIG. 4), via the encapsulation technology. The inorganic pelletized perlitic lightweight granules include expanded perlite 110 as core and cementitious material 120 as shell, and have a core-shell structure with the porous perlite core encapsulated by dense cementitious shell. Compared with the water capsule of the previous applications, the inorganic pelletized perlitic lightweight granules of the present invention exhibit a lower cost, appropriate selection of materials, ease of production, superior fire resistance, higher crushing strength, and better compatibility with concrete.

Figure 5:
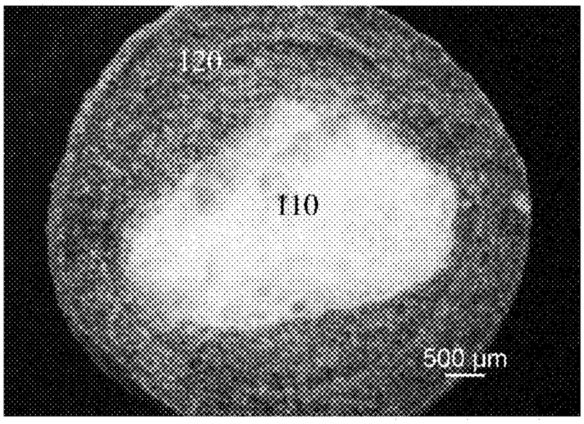
FIG. 5 is an optical microscope image of the cross-section of inorganic pelletized perlitic lightweight granule of the present invention.
Figure 6A:
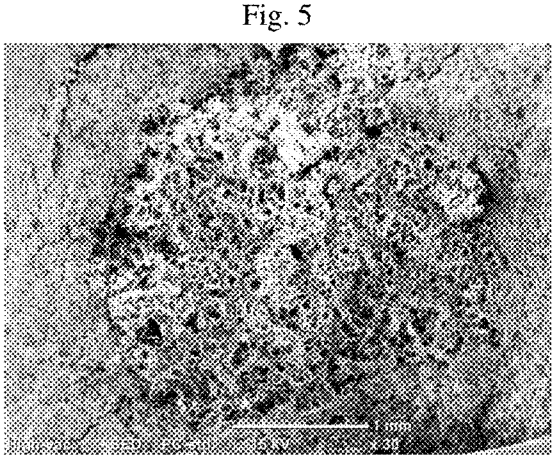
FIGS. 6*a* to 6*c* are SEM images of the inorganic pelletized perlitic lightweight granule of the present invention.
Figure 6B:
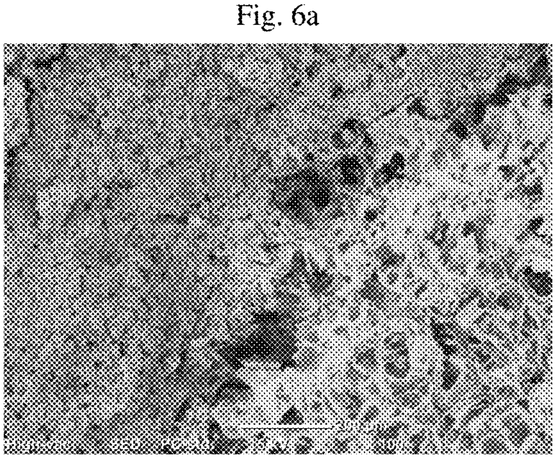
Figure 6C:
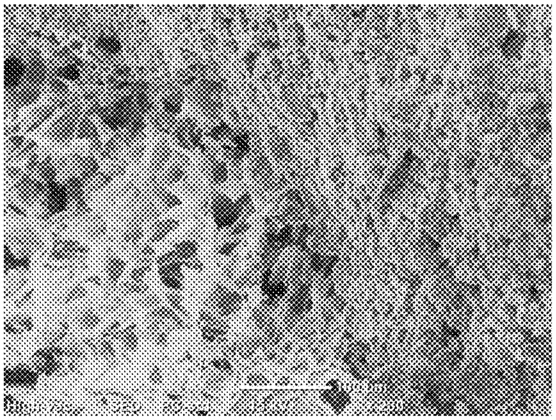

As shown in FIGS. 5 and 6, it can be seen by optical microscopy and scanning electron microscopy that the expanded perlite has a porous structure, and it has an irregular shape and a coarse surface; the cementitious shell made from cementitious material has a dense structure; and the cementitious material firmly adheres to the surface of the expanded perlite, and a strong interfacial transition zone is formed between the expanded perlite and the cementitious material.

Figure 7:
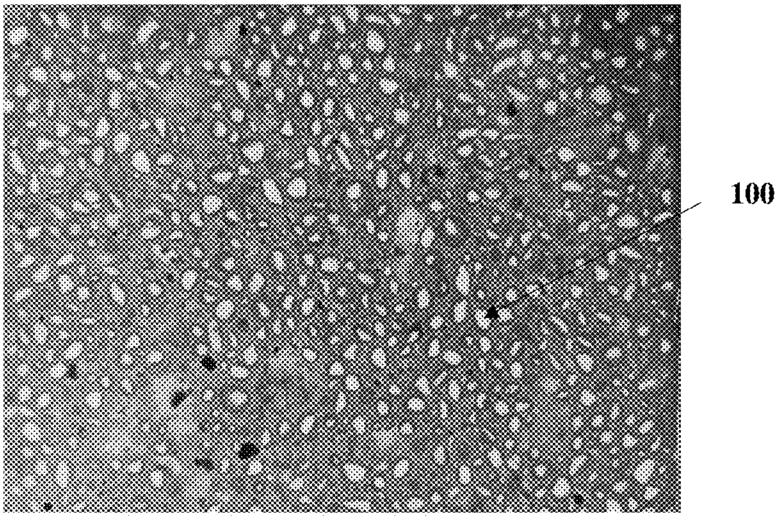
FIG. 7 is a photograph of the cross section of the lightweight concrete of the present invention.
Figure 8:
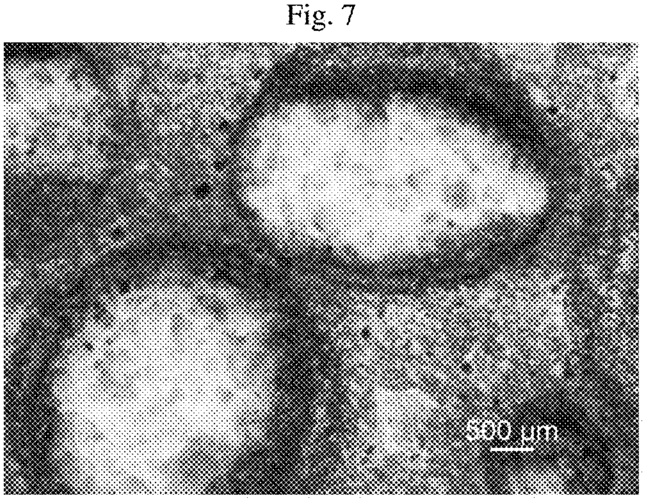
FIG. 8 is an optical microscope image of the cross section of the lightweight concrete of the present invention.

The present invention relates to the use of the inorganic pelletized perlitic lightweight granules 100 in producing lightweight concrete (as shown in FIG. 7). As shown in FIG. 8, under an optical microscope, the cementitious shell of the inorganic pelletized perlitic lightweight granule reacts with the cementitious binder material of surrounding concrete, resulting in formation of a high-strength interfacial transition zone between the inorganic pelletized perlitic lightweight granules and the concrete matrix, which facilitates the interfacial bonding between the inorganic pelletized perlitic lightweight granules and the concrete matrix.

In order that those skilled in the art understands and implements the present invention, the present invention will be further described in detail below in reference to specific embodiments.

Example 1

A kind of inorganic pelletized perlitic lightweight granules which include expanded perlite as core and cementitious materials as shell, having a core-shell structure with the porous perlite core encapsulated by the dense cementitious shell. The cementitious materials and the expanded perlite in the inorganic pelletized perlitic lightweight granules have a volume ratio (i.e., shell/core ratio by volume) of 1.6:1, and the cementitious materials contain cement and fly ash in a mass ratio of 1:0.5. The obtained inorganic pelletized perlitic lightweight granules have a particle size of no larger than 11 mm and a dry density of 850 $kg/m^3$.

The preparation process of the inorganic pelletized perlitic lightweight granules includes the following steps:

S1. Mixing: required amounts of expanded perlite and cementitious materials were mixed and then moved to a pan pelletizer, or alternatively, required amounts of expanded perlite and cementitious material were mixed in the pan pelletizer, to obtain a mixture of expanded perlite and cementitious materials;

S2. Pelletization: the pelletizer was turned on and run with the inclination angle of the pelletizer pan being 20 to 60 degrees and the rotating speed of pelletizer pan being 10 to 60 r/min. Required amount of water (say 27 wt % of the mass of cementitious material) was sprayed automatically to the mixture obtained in Step S1 over 35 minutes to allow the cementitious material gradually encapsulating the expanded perlite under water spraying. After the cementitious material fully adhered to the surface of the expanded perlite, kept running the pelletizer for at least 5 minutes to obtain the inorganic pelletized perlitic lightweight granules; and S3. Curing: cured the inorganic pelletized perlitic lightweight granules obtained in Step S2 in a sealed environment for at least 1 day.

Here, S1 mixing, S2 pelletization, and S3 curing steps were repeated for 1-4 times.

Example 2

A kind of inorganic pelletized perlitic lightweight granules which include expanded perlite as core and cementitious materials as shell, having a core-shell structure with the porous perlite core encapsulated by the dense cementitious shell. The cementitious materials and the expanded perlite in the inorganic pelletized perlitic lightweight granules have a volume ratio (i.e., shell/core ratio by volume) of 0.8:1, and the cementitious material contains cement and fly ash in a mass ratio of 1:0.3. The obtained inorganic pelletized perlitic lightweight granules have a particle size of no larger than 5 mm and a dry density of 700 kg/m$^3$.

The preparation process of the inorganic pelletized perlitic lightweight granules includes the following steps:

S1. Mixing: required amounts of expanded perlite and cementitious materials were mixed and then moved to a pan pelletizer, or alternatively, required amounts of expanded perlite and cementitious material were mixed in the pan pelletizer, to obtain a mixture of expanded perlite and cementitious materials;

S2. Pelletization: the pelletizer was turned on and run with the inclination angle of the pelletizer pan being 20 to 60 degrees and the rotating speed of pelletizer pan being 10 to 60 r/min. Required amount of water (say 24 wt % of the mass of cementitious material) was sprayed automatically to the mixture obtained in Step S1 over 22 minutes to allow the cementitious material gradually encapsulating the expanded perlite under water spraying. After the cementitious material fully adhered to the surface of the expanded perlite, kept running the pelletizer for at least 5 minutes to obtain the inorganic pelletized perlitic lightweight granules; and S3. Curing: cured the inorganic pelletized perlitic lightweight granules obtained in Step S2 in a sealed environment for at least 1 day.

Here, S1 mixing, S2 pelletization, and S3 curing steps were repeated for 1-4 times.

Example 3

A kind of inorganic pelletized perlitic lightweight granules which include expanded perlite as core and cementitious materials as shell, having a core-shell structure with the porous perlite core encapsulated by the dense cementitious shell. The cementitious materials and the expanded perlite in the inorganic pelletized perlitic lightweight granules have a volume ratio (i.e., shell/core ratio by volume) of 2.4:1, and the cementitious material contains cement and fly ash in a mass ratio of 1:0.7. The obtained inorganic pelletized perlitic lightweight granules have a particle size of no larger than 15 mm and a dry density of 1100 kg/m$^3$.

The preparation process of the inorganic pelletized perlitic lightweight granules includes the following steps:

S1. Mixing: required amounts of expanded perlite and cementitious materials were mixed and then moved to a pan pelletizer, or alternatively, required amounts of expanded perlite and cementitious material were mixed in the pan pelletizer, to obtain a mixture of expanded perlite and cementitious materials;

S2. Pelletization: the pelletizer was turned on and run with the inclination angle of the pelletizer pan being 20 to 60 degrees and the rotating speed of pelletizer pan being 10 to 60 r/min. Required amount of water (say 31 wt % of the mass of cementitious material) was sprayed automatically to the mixture obtained in Step S1 over 47 minutes to allow the cementitious material gradually encapsulating the expanded perlite under water spraying. After the cementitious material fully adhered to the surface of the expanded perlite, kept running the pelletizer for at least 5 minutes to obtain the inorganic pelletized perlitic lightweight granules; and S3. Curing: cured the inorganic pelletized perlitic lightweight granules obtained in Step S2 in a sealed environment for at least 1 day.

Here, S1 mixing, S2 pelletization, and S3 curing steps were repeated for 1-4 times.

Example 4

A kind of inorganic pelletized perlitic lightweight granules which include expanded perlite as core and cementitious materials as shell, having a core-shell structure with the porous perlite core encapsulated by the dense cementitious shell. The cementitious materials and the expanded perlite in the inorganic pelletized perlitic lightweight granules have a volume ratio (i.e., shell/core ratio by volume) of 0.3:1, and the cementitious material contains cement only. The obtained inorganic pelletized perlitic lightweight granules have a particle size of no larger than 0.5 mm and a dry density of 580 kg/m$^3$.

The preparation process of the inorganic pelletized perlitic lightweight granules includes the following steps:

S1. Mixing: required amounts of expanded perlite and cementitious materials were mixed and then moved to a pan pelletizer, or alternatively, required amounts of expanded perlite and cementitious material were mixed in the pan pelletizer, to obtain a mixture of expanded perlite and cementitious materials;

S2. Pelletization: the pelletizer was turned on and run with the inclination angle of the pelletizer pan being 20 to 60 degrees and the rotating speed of pelletizer pan being 10 to 60 r/min. Required amount of water (say 20 wt % of the mass of cementitious material) was sprayed automatically to the mixture obtained in Step S1 over 10 minutes to allow the cementitious material gradually encapsulating the expanded perlite under water spraying. After the cementitious material fully adhered to the surface of the expanded perlite, kept running the pelletizer for at least 5 minutes to obtain the inorganic pelletized perlitic lightweight granules; and S3. Curing: cured the inorganic pelletized perlitic lightweight granules obtained in Step S2 in a sealed environment for at least 1 day.

Here, S1 mixing, S2 pelletization, and S3 curing steps were repeated for 1-4 times.

Example 5

A kind of inorganic pelletized perlitic lightweight granules which include expanded perlite as core and cementitious materials as shell, having a core-shell structure with the porous perlite core encapsulated by the dense cementitious shell. The cementitious materials and the expanded perlite in the inorganic pelletized perlitic lightweight granules have a volume ratio (i.e., shell/core ratio by volume) of 3.0:1, and the cementitious material contains cement and fly ash in a mass ratio of 1:1. The obtained inorganic pelletized perlitic lightweight granules have a particle size of no larger than 20 mm and a dry density of 1200 kg/m$^3$.

The preparation process of the inorganic pelletized perlitic lightweight granules includes the following steps:

S1. Mixing: required amounts of expanded perlite and cementitious materials were mixed and then moved to a pan pelletizer, or alternatively, required amounts of expanded perlite and cementitious material were mixed in the pan pelletizer, to obtain a mixture of expanded perlite and cementitious materials;

S2. Pelletization: the pelletizer was turned on and run with the inclination angle of the pelletizer pan being 20 to 60 degrees and the rotating speed of pelletizer pan being 10 to 60 r/min. Required amount of water (say 35 wt % of the mass of cementitious material) was sprayed automatically to the mixture obtained in Step S1 over 60 minutes to allow the cementitious material gradually encapsulating the expanded perlite under water spraying. After the cementitious material fully adhered to the surface of the expanded perlite, kept running the pelletizer for at least 5 minutes to obtain the inorganic pelletized perlitic lightweight granules; and S3. Curing: cured the inorganic pelletized perlitic lightweight granules obtained in Step S2 in a sealed environment for at least 1 day.

Here, S1 mixing, S2 pelletization, and S3 curing steps were repeated for 1-4 times.

Example 6

A kind of inorganic pelletized perlitic lightweight granules which include expanded perlite as core and cementitious materials as shell, having a core-shell structure with the porous perlite core encapsulated by the dense cementitious shell. The cementitious materials and the expanded perlite in the inorganic pelletized perlitic lightweight granules have a volume ratio (i.e., shell/core ratio by volume) of 0.8:1, and the cementitious material contains cement and fly ash in a mass ratio of 1:0.5. The obtained inorganic pelletized perlitic lightweight granules have a particle size of no larger than 11 mm and a dry density of 850 kg/m$^3$.

The preparation process of the inorganic pelletized perlitic lightweight granules includes the following steps:

S1. Mixing: required amounts of expanded perlite and cementitious materials were mixed and then moved to a pan pelletizer, or alternatively, required amounts of expanded perlite and cementitious material were mixed in the pan pelletizer, to obtain a mixture of expanded perlite and cementitious materials;

S2. Pelletization: the pelletizer was turned on and run with the inclination angle of the pelletizer pan being 20 to 60 degrees and the rotating speed of pelletizer pan being 10 to 60 r/min. Required amount of water (say 27 wt % of the mass of cementitious material) was sprayed automatically to the mixture obtained in Step S1 over 35 minutes to allow the cementitious material gradually encapsulating the expanded perlite under water spraying. After the cementitious material fully adhered to the surface of the expanded perlite, kept running the pelletizer for at least 5 minutes to obtain the inorganic pelletized perlitic lightweight granules; and S3. Curing: cured the inorganic pelletized perlitic lightweight granules obtained in Step S2 in a sealed environment for at least 1 day.

Here, S1 mixing, S2 pelletization, and S3 curing steps were repeated for 1-4 times.

Example 7

A kind of inorganic pelletized perlitic lightweight granules which include expanded perlite as core and cementitious materials as shell, having a core-shell structure with the porous perlite core encapsulated by the dense cementitious shell. The cementitious materials and the expanded perlite in the inorganic pelletized perlitic lightweight granules have a volume ratio (i.e., shell/core ratio by volume) of 2.4:1, and the cementitious material contains cement and fly ash in a mass ratio of 1:0.5. The obtained inorganic pelletized perlitic lightweight granules have a particle size of no larger than 11 mm and a dry density of 850 kg/m$^3$.

The preparation process of the inorganic pelletized perlitic lightweight granules includes the following steps:

S1. Mixing: required amounts of expanded perlite and cementitious materials were mixed and then moved to a pan pelletizer, or alternatively, required amounts of expanded perlite and cementitious material were mixed in the pan pelletizer, to obtain a mixture of expanded perlite and cementitious materials;

S2. Pelletization: the pelletizer was turned on and run with the inclination angle of the pelletizer pan being 20 to 60 degrees and the rotating speed of pelletizer pan being 10 to 60 r/min. Required amount of water (say 27 wt % of the mass of cementitious material) was sprayed automatically to the mixture obtained in Step S1 over 35 minutes to allow the cementitious material gradually encapsulating the expanded perlite under water spraying. After the cementitious material fully adhered to the surface of the expanded perlite, kept running the pelletizer for at least 5 minutes to obtain the inorganic pelletized perlitic lightweight granules; and S3. Curing: cured the inorganic pelletized perlitic lightweight granules obtained in Step S2 in a sealed environment for at least 1 day.

Here, S1 mixing, S2 pelletization, and S3 curing steps were repeated for 1-4 times.

Example 8

A kind of inorganic pelletized perlitic lightweight granules which include expanded perlite as core and cementitious materials as shell, having a core-shell structure with the porous perlite core encapsulated by the dense cementitious shell. The cementitious materials and the expanded perlite in the inorganic pelletized perlitic lightweight granules have a volume ratio (i.e., shell/core ratio by volume) of 0.3:1, and the cementitious material contains cement and fly ash in a mass ratio of 1:0.5. The obtained inorganic pelletized perlitic lightweight granules have a particle size of no larger than 11 mm and a dry density of 850 $kg/m^3$.

The preparation process of the inorganic pelletized perlitic lightweight granules includes the following steps:

S1. Mixing: required amounts of expanded perlite and cementitious materials were mixed and then moved to a pan pelletizer, or alternatively, required amounts of expanded perlite and cementitious material were mixed in the pan pelletizer, to obtain a mixture of expanded perlite and cementitious materials;

S2. Pelletization: the pelletizer was turned on and run with the inclination angle of the pelletizer pan being 20 to 60 degrees and the rotating speed of pelletizer pan being 10 to 60 r/min. Required amount of water (say 27 wt % of the mass of cementitious material) was sprayed automatically to the mixture obtained in Step S1 over 35 minutes to allow the cementitious material gradually encapsulating the expanded perlite under water spraying. After the cementitious material completely adhered to the surface of the expanded perlite, kept running the pelletizer for at least 5 minutes to obtain the inorganic pelletized perlitic lightweight granules; and S3. Curing: cured the inorganic pelletized perlitic lightweight granules obtained in Step S2 in a sealed environment for at least 1 day.

Here, S1 mixing, S2 pelletization, and S3 curing steps were repeated for 1-4 times.

Example 9

A kind of inorganic pelletized perlitic lightweight granules which include expanded perlite as core and cementitious materials as shell, having a core-shell structure with the porous perlite core encapsulated by the dense cementitious shell. The cementitious materials and the expanded perlite in the inorganic pelletized perlitic lightweight granules have a volume ratio (i.e., shell/core ratio by volume) of 3.0:1, and the cementitious material contains cement and fly ash in a mass ratio of 1:0.5. The obtained inorganic pelletized perlitic lightweight granules have a particle size of no larger than 11 mm and a dry density of 850 $kg/m^3$.

The preparation process of the inorganic pelletized perlitic lightweight granules includes the following steps:

S1. Mixing: required amounts of expanded perlite and cementitious materials were mixed and then moved to a pan pelletizer, or alternatively, required amounts of expanded perlite and cementitious material were mixed in the pan pelletizer, to obtain a mixture of expanded perlite and cementitious materials;

S2. Pelletization: the pelletizer was turned on and run with the inclination angle of the pelletizer pan being 20 to 60 degrees and the rotating speed of pelletizer pan being 10 to 60 r/min. Required amount of water (say 27 wt % of the mass of cementitious material) was sprayed automatically to the mixture obtained in Step S1 over 35 minutes to allow the cementitious material gradually encapsulating the expanded perlite under water spraying. After the cementitious material completely adhered to the surface of the expanded perlite, kept running the pelletizer for at least 5 minutes to obtain the inorganic pelletized perlitic lightweight granules; and S3. Curing: cured the inorganic pelletized perlitic lightweight granules obtained in Step S2 in a sealed environment for at least 1 day.

Here, S1 mixing, S2 pelletization, and S3 curing steps were repeated for 1-4 times.

Example 10

A kind of inorganic pelletized perlitic lightweight granules which include expanded perlite as core and cementitious materials as shell, having a core-shell structure with the porous perlite core encapsulated by the dense cementitious shell. The cementitious materials and the expanded perlite in the inorganic pelletized perlitic lightweight granules have a volume ratio (i.e., shell/core ratio by volume) of 0.86:1, and the cementitious material contains cement and fly ash in a mass ratio of 1:1. The expanded perlite used was Type I expanded perlite with particle size distribution as shown in Table 1. The obtained inorganic pelletized perlitic lightweight granules have a dry density of 673 $kg/m^3$ and a particle size distribution as shown in Table 2.

Example 11

A kind of inorganic pelletized perlitic lightweight granules which include expanded perlite as core and cementitious materials as shell, having a core-shell structure with the porous perlite core encapsulated by the dense cementitious shell. The cementitious materials and the expanded perlite in the inorganic pelletized perlitic lightweight granules have a volume ratio (i.e., shell/core ratio by volume) of 1.388:1, and the cementitious material contains cement and fly ash in a mass ratio of 1:0.5. The expanded perlite used was Type I expanded perlite with particle size distribution as shown in Table 1. The obtained inorganic pelletized perlitic lightweight granules have a dry density of 855 $kg/m^3$ and a particle size distribution as shown in Table 2.

Example 12

A kind of inorganic pelletized perlitic lightweight granules which include expanded perlite as core and cementitious materials as shell, having a core-shell structure with the porous perlite core encapsulated by the dense cementitious shell. The cementitious materials and the expanded perlite in the inorganic pelletized perlitic lightweight granules have a volume ratio (i.e., shell/core ratio by volume) of 2.890:1, and the cementitious material contains cement only. The expanded perlite used was Type II expanded perlite with particle size distribution as shown in Table 1. The obtained inorganic pelletized perlitic lightweight granules have a dry density of 1072 $kg/m^3$ and a particle size distribution as shown in Table 2.

Example 13

A kind of inorganic pelletized perlitic lightweight granules which include expanded perlite as core and cementitious materials as shell, having a core-shell structure with the porous perlite core encapsulated by the dense cementitious shell. The cementitious materials and the expanded perlite in the inorganic pelletized perlitic lightweight granules have a volume ratio (i.e., shell/core ratio by volume) of 2.822:1, and the cementitious material contains cement only. The expanded perlite used was Type III expanded perlite with particle size distribution as shown in Table 1. The obtained inorganic pelletized perlitic lightweight granules have a dry density of 1058 $kg/m^3$ and a size range of 4.75~16.0 mm.

Figure 3:
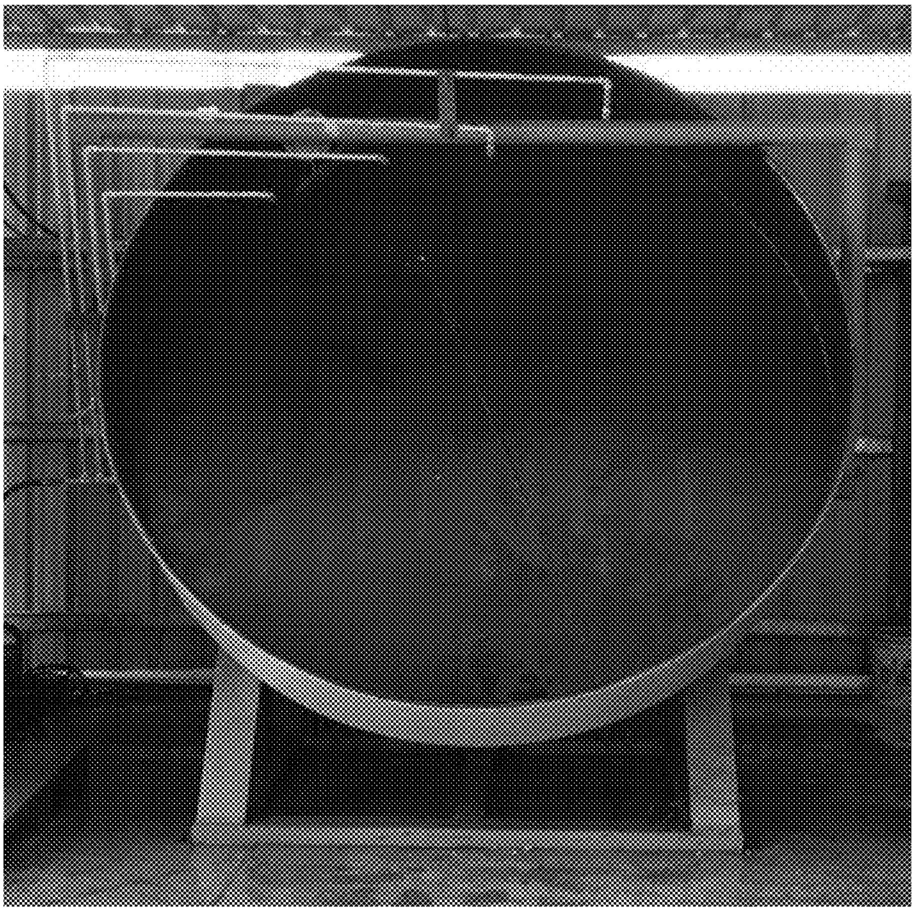
FIG. 3 is a photograph of pan pelletizer.

The inorganic pelletized perlitic lightweight granules of Examples 10 to 13 were prepared by a two-step encapsulation process. A pan pelletizer, as shown in FIG. 3, was used for carrying out the encapsulation process. The pelletizer was equipped with a sprayer at the upper left portion of the pan, and the sprayer is able to automatically spray water into the pan. The encapsulation process includes the following steps:

1. The first stage encapsulation process involves the steps:
   a) The angle of the pan relative to the horizontal plane was set to be 45°;
   b) A specified amount of expanded perlite was added into the pelletizer;
   c) A specified amount of cementitious material was added into the pelletizer;
   d) The pelletizer was turned on and run at a rotation speed of the pan of 5 r/s for about 1 minute to mix the expanded perlite and cementitious materials (i.e., S1 mixing);
   e) The speed of pan was increased to 20 r/min, and water was automatically sprayed to the pan by the nozzle until the water to cementitious material ratio attained 0.216 to 0.324; After the cementitious material completely adhered to the surface of the expanded perlite, kept running the pelletizer for at least 5 minutes to further dense the cementitious shell and obtain the inorganic pelletized perlitic lightweight granules (i.e., S2 pelletization); and
   f) The pelletizer was turned off for transferring the resultant particles (semi-finished particles) to a sealed environment and cured for 24 hours (i.e., S3 curing).
2. The second stage encapsulation process involves the steps:
   a) A specified amount of semi-finished particles obtained in the first stage were added into the pelletizer;
   b) A specified amount of cementitious material was added into the pelletizer;
   c) The pelletizer was turned on and run at a rotation speed of the pan of 5 r/s for about 1 minute to mix the expanded perlite and cementitious materials (i.e., S1 mixing);
   d) The speed of pan was increased to 20 r/min, and water was automatically sprayed to the pan by the nozzle until the water to cementitious material (added in step b) ratio attained 0.192 to 0.288; After the cementitious material completely adhered to the surface of the expanded perlite, kept running the pelletizer for at least 5 minutes to further dense the cementitious shell and obtain the inorganic pelletized perlitic lightweight granules (i.e., S2 pelletization); and
   e) The pelletizer was turned off for transferring the resultant particles (finished particles) to a sealed environment or an environment that can avoid moisture loss and cured for 7 days (S3' curing).

In Examples 10 to 13, the main difference amongst various types of expanded perlite used are their size distribution. Table 1 shows the size distribution of the three types of expanded perlite used in the examples of the present invention. The size distribution of the inorganic pelletized perlitic lightweight granules obtained in Examples 10 to 12 are shown in Table 2.

TABLE 1

Size distributions of the expanded perlite I, II, and III (cumulative percentage of mass retained on sieve)

| | Types of expanded perlite | | |
|---|---|---|---|
| Sieve size (mm) | I | II | III |
| 4.75 | 0.0 wt % | 1.1 wt % | 22.5 wt % |
| 2.36 | 68.0 wt % | 84.7 wt % | 85.9 wt % |
| 1.18 | 87.6 wt % | 90.0 wt % | 88.5 wt % |
| 0.60 | 93.3 wt % | 91.7 wt % | 92.4 wt % |
| 0.30 | 94.3 wt % | 91.9 wt % | 96.9 wt % |
| 0.15 | 95.4 wt % | 94.2 wt % | 97.9 wt % |
| 0.075 | 98.0 wt % | 98.2 wt % | 98.9 wt % |
| <0.075 | 100.0 wt % | 100.0 wt % | 100.0 wt % |

TABLE 2

Size distribution of the inorganic pelletized perlitic lightweight granules obtained in Examples 10 to 12 (cumulative percentage of mass retained on sieve)

| | Inorganic pelletized perlitic lightweight granules | | |
|---|---|---|---|
| Sieve size (mm) | Example 10 | Example 11 | Example 12 |
| 10.0 | 0.0 wt % | 0.0 wt % | 5.4 wt % |
| 4.75 | 2.8 wt % | 7.9 wt % | 81.0 wt % |
| 2.36 | 85.4 wt % | 87.3 wt % | 99.3 wt % |
| 1.18 | 98.6 wt % | 95.6 wt % | 99.9 wt % |
| 0.60 | 99.6 wt % | 98.3 wt % | 100.0 wt % |
| 0.30 | 99.6 wt % | 99.3 wt % | 100.0 wt % |
| 0.15 | 100.0 wt % | 99.5 wt % | 100.0 wt % |
| 0.075 | 100.0 wt % | 99.9 wt % | 100.0 wt % |
| <0.075 | 100.0 wt % | 100.0 wt % | 100.0 wt % |

Examples 10 to 13 examine the effects of the size distribution of expanded perlite, the composition of shell materials and the volume ratio of shell/core on the performance of the inorganic pelletized perlitic lightweight granules, as summarized in Table 3. The thickness of the shell of the inorganic pelletized perlitic lightweight granules obtained in the examples increased going down Table 3. It can be seen from Table 3 that, when different expanded perlite, different shell materials and different shell/core ratios were employed, inorganic pelletized perlitic lightweight granules having different densities and strengths were prepared. Such inorganic pelletized perlitic lightweight granules having tailorable performance can be used for the production of lightweight concrete with different performance.

TABLE 3

Performance of inorganic pelletized perlitic lightweight granules

| Example | Types of expanded perlite | Composition of shell materials | Shell/core ratio by volume | Dry density (kg/m$^3$) | 1-hour water absorption rate (%) | 7-day crushing strength (MPa) |
|---|---|---|---|---|---|---|
| 10 | I | 50% cement<br>50% fly ash | 0.860 | 673 | 5.1 | 1.54 |

TABLE 3-continued

| Performance of inorganic pelletized perlitic lightweight granules | | | | | | |
|---|---|---|---|---|---|---|
| Example | Types of expanded perlite | Composition of shell materials | Shell/core ratio by volume | Dry density ($kg/m^3$) | 1-hour water absorption rate (%) | 7-day crushing strength (MPa) |
| 11 | I | 65% cement<br>35% fly ash | 1.388 | 855 | 2.6 | 4.29 |
| 12 | II | 100% cement | 2.890 | 1072 | 1.2 | 5.47 |
| 13 | III | 100% cement | 2.822 | 1058 | 0.6 | 6.20 |

Application Example 1

The inorganic pelletized perlitic lightweight granules obtained in Example 10 were used to prepare concrete containing 540 $kg/m^3$ of cement, 60 $kg/m^3$ of silica fume, 60 $kg/m^3$ of fly ash, 549 $kg/m^3$ of the inorganic pelletized perlitic lightweight granules, 430 $kg/m^3$ of limestone, 180 $kg/m^3$ of water, and 8.4 $kg/m^3$ of superplasticizer (e.g. naphthalene and polycarboxylate based superplasticizers).

Application Example 2

The inorganic pelletized perlitic lightweight granules obtained in Example 11 were used to prepare concrete containing 600 $kg/m^3$ of cement, 735 $kg/m^3$ of the inorganic pelletized perlitic lightweight granules, 120 $kg/m^3$ of limestone, 170 $kg/m^3$ of natural coarse aggregates, 180 $kg/m^3$ of water, 7.0 $kg/m^3$ of superplasticizer, and 0.5 $kg/m^3$ of viscosity modifying agent (such as acrylic copolymer, polyvinyl alcohol, and polyvinylpyrrolidone based viscosity modifiers).

Application Example 3

The inorganic pelletized perlitic lightweight granules obtained in Example 11 were used to prepare concrete containing 600 $kg/m^3$ of cement, 735 $kg/m^3$ of the inorganic pelletized perlitic lightweight granules, 290 $kg/m^3$ of limestone, 180 $kg/m^3$ of water, and 6.7 $kg/m^3$ of superplasticizer.

Application Example 4

The inorganic pelletized perlitic lightweight granules obtained in Example 12 were used to prepare concrete containing 540 $kg/m^3$ of cement, 60 $kg/m^3$ of silica fume, 1027 $kg/m^3$ of the inorganic pelletized perlitic lightweight granules, 190 $kg/m^3$ of limestone, 180 $kg/m^3$ of water, 7.0 $kg/m^3$ of superplasticizer, and 0.5 $kg/m^3$ of viscosity modifying agent.

Application Example 5

The inorganic pelletized perlitic lightweight granules obtained in Examples 11 and 13 were used to prepare concrete containing 450 $kg/m^3$ of cement, 150 $kg/m^3$ of fly ash, 565 $kg/m^3$ of the inorganic pelletized perlitic lightweight granules (Example 11), 345 $kg/m^3$ of the inorganic pelletized perlitic lightweight granules (Example 13), 100 $kg/m^3$ of limestone, 180 $kg/m^3$ of water, and 4.2 $kg/m^3$ of superplasticizer.

The concrete of aforementioned application examples 1 to 5 was prepared following the below procedures:

1) Specified amounts of cement, silica fume (if present), fly ash (if present), inorganic pelletized perlitic lightweight granules, limestone, natural coarse aggregates (if present), and water were weighed;
2) Specified amounts of superplasticizer and viscosity modifying agent (if present) were weighed and added into the weighed water;
3) The cement, silica fume (if present), fly ash (if present), limestone, lightweight expanded perlite inorganic particles, and natural coarse aggregates (if present) were added into the mixer and dry mixed for at least 1 minute;
4) The mixture of water, superplasticizer, and viscosity modifying agent (if present) were added into the mixer and wet mixed for at least 3 minutes;
5) The resultant fresh concrete mixture was placed into the molds;
6) The concrete mixture was properly cured for at least 7 days after concrete placement to avoid moisture loss.

Application examples 1 to 5 provided a basis to investigate the effects of the type and amount of the inorganic pelletized perlitic lightweight granules on the performance of concrete. The results of concrete produced are shown in Table 4. It can be seen from Table 4 that the inorganic pelletized perlitic lightweight granules with a thick shell can be used to produce high-strength, lightweight concrete, while the inorganic pelletized perlitic lightweight granules with a thin shell can be used to produce normal-strength, lightweight concrete. Comparing the results of application examples 1, 2 and 3, it can be seen that when less limestone but more inorganic pelletized perlitic lightweight granules with thick shell were employed (application examples 2 and 3), the resultant concrete had a higher density, and significantly enhanced 7-day compressive strength and 28-day compressive strength. Comparing the results of application examples 1 to 4, it can be seen that the inorganic pelletized perlitic lightweight granules with thicker shell can provide concrete with a higher strength. As fly ash and two different types of inorganic pelletized perlitic lightweight granules with and without fly ash were included, the concrete prepared in application example 5 is more environmentally friendly and economical than the concrete prepared in other application examples.

TABLE 4

Effects of type and amount of inorganic pelletized perlitic lightweight granules on the performance of concrete

| Application example | | 1 | 2 | 3 | 4 | 5 | |
|---|---|---|---|---|---|---|---|
| Type of inorganic pelletized perlitic lightweight granules | Inorganic pelletized perlitic lightweight granules | Example 10 | Example 11 | Example 11 | Example 12 | Example 11 | Example 13 |
| | Types of expanded perlite | I | I | I | II | I | III |
| | Composition of shell materials | 50% cement 50% fly ash | 65% cement 35% fly ash | 65% cement 35% fly ash | 100% cement | 65% cement 35% fly ash | 100% cement |
| Concrete composition | Cement | 540 | 600 | 600 | 540 | 450 | |
| | Silica fume | 60 | / | / | 60 | / | |
| | Fly ash | 60 | / | / | / | 150 | |
| | Inorganic pelletized perlitic lightweight granules (Example 10/11/12) | 549 | 735 | 735 | 1027 | 565 | |
| | Inorganic pelletized perlitic lightweight granules (Example 13) | / | / | / | / | 345 | |
| | limestone | 430 | 120 | 290 | 190 | 100 | |
| | Natural coarse aggregate | / | 170 | / | / | / | |
| | Water | 180 | 180 | 180 | 180 | 180 | |
| | Superplasticizer | 8.4 | 7.0 | 6.7 | 7.0 | 4.2 | |
| | Viscosity modifying agent | / | 0.5 | / | 0.5 | / | |
| Result | 7-day compressive strength (MPa) | 31.6 | 44.4 | 45.4 | 50.6 | 35.6 | |
| | 28-day compressive strength (MPa) | 40.9 | 51.4 | 53.4 | 68.9 | 45.2 | |
| | Equilibrium density ($kg/m^3$) | 1695 | 1854 | 1847 | 1967 | 1765 | |
| | Dry density ($kg/m^3$) | / | 1680 | 1672 | / | 1605 | |

It is obvious that the above-mentioned embodiments of the present invention are merely examples to clearly illustrate the present invention, but not intended to limit the embodiments of the present invention. For those of ordinary skill in the art, other changes or modifications in different forms can be made on the basis of the above description. It is unnecessary and impossible to list all the implementations here. Any modifications, equivalent substitutions, and improvements made within the spirit and principle of the present invention should be included within the scope of the claims of the present invention.

What is claimed is:

1. A lightweight concrete produced from inorganic pelletized perlitic lightweight granules, comprising the following components per cubic meter of the lightweight concrete:

600 kg of cement, 735 kg of inorganic pelletized perlitic lightweight granules, 120 kg of limestone, 170 kg of natural coarse aggregates, 180 kg of water, 7.0 kg of superplasticizer, and 0.5 kg of viscosity modifying agent; or 600 kg of cement, 735 kg of inorganic pelletized perlitic lightweight granules, 290 kg of limestone, 180 kg of water, and 6.7 kg of superplasticizer; or 540 kg of cement, 60 kg of silica fume, 1027 kg of inorganic pelletized perlitic lightweight granules, 190 kg of limestone, 180 kg of water, 7.0 kg of superplasticizer, and 0.5 kg of viscosity modifying agent;

wherein the inorganic pelletized perlitic lightweight granules comprise expanded perlite as core and cementitious material as shell, forming a core-shell structure with the perlite core encapsulated by cementitious shell, wherein the cementitious material and the expanded perlite have a volume ratio of 1: (1.388 to 3.0);

wherein the inorganic pelletized perlitic lightweight granules have a dry density of 855 to 1200 $kg/m^3$; and wherein the cementitious material is cement, or a mixture of cement and fly ash, and in response to the cementitious material being the mixture of cement and fly ash a mass ratio of the cement to the fly ash is 1:0.54.

2. The lightweight concrete produced from inorganic pelletized perlitic lightweight granules according to claim 1, wherein the perlite core has a porous structure, and the cementitious shell has a dense structure.

3. The lightweight concrete produced from inorganic pelletized perlitic lightweight granules according to claim 1, wherein the inorganic pelletized perlitic lightweight granules have a particle size of 0.5 to 20 mm.

4. The lightweight concrete produced from inorganic pelletized perlitic lightweight granules according to claim 1, wherein the expanded perlite is selected from expanded perlite with different size distributions.

5. The lightweight concrete produced from inorganic pelletized perlitic lightweight granules according to claim 1, wherein the core-shell structure is formed via an encapsulation process with a pelletizer.

6. The lightweight concrete produced from inorganic pelletized perlitic lightweight granules according to claim 1, wherein the inorganic pelletized perlitic lightweight granules have a water absorption rate below 5.5%.

* * * * *